Nov. 21, 1944.    G. E. FRANCK    2,363,123
LIQUID SHUT-OFF VALVE
Filed Jan. 12, 1942    2 Sheets-Sheet 1
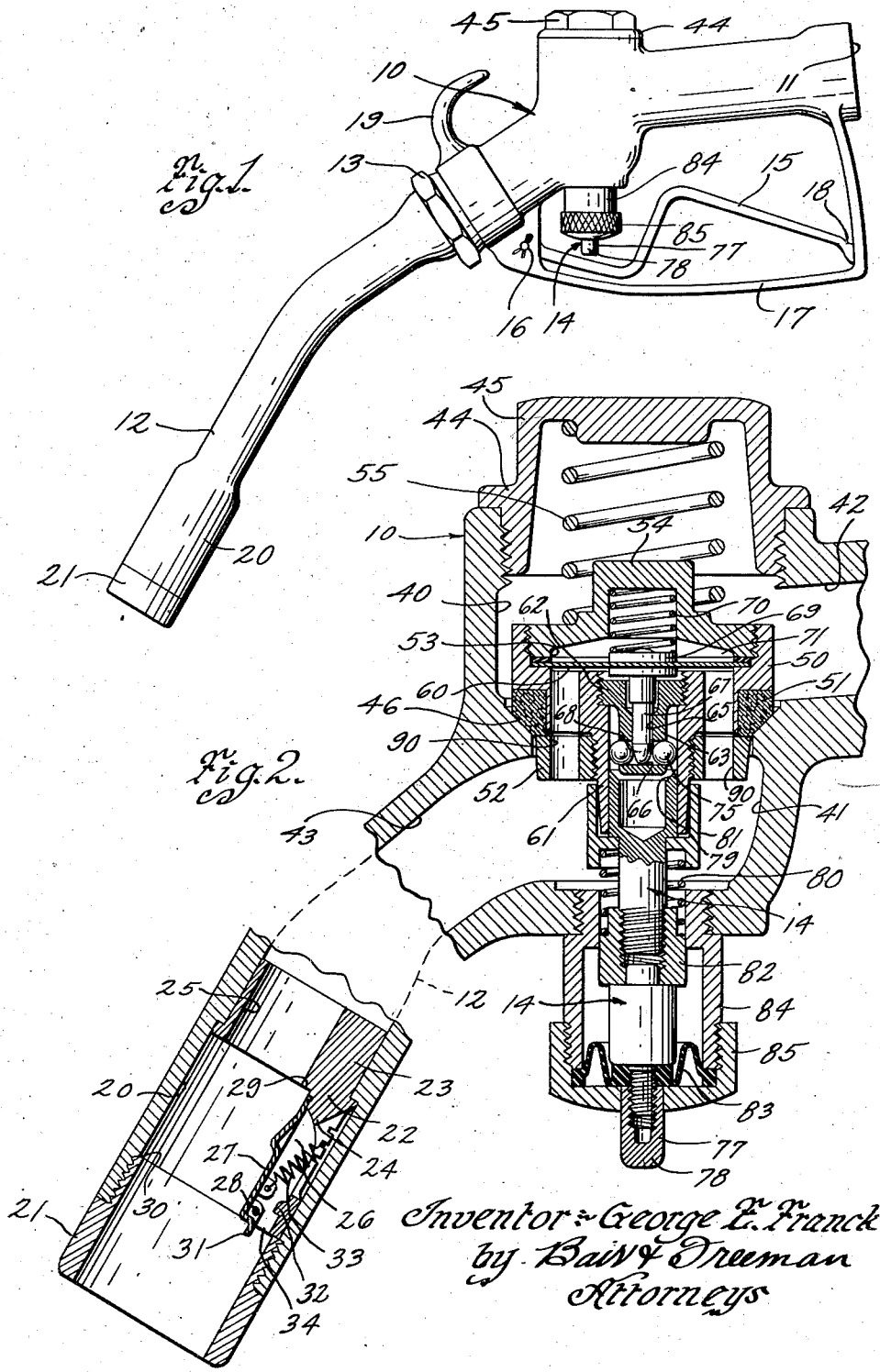

Nov. 21, 1944.  G. E. FRANCK  2,363,123
LIQUID SHUT-OFF VALVE
Filed Jan. 12, 1942   2 Sheets-Sheet 2

Inventor:- George E. Franck
by Bair & Freeman
Attorneys

Patented Nov. 21, 1944

2,363,123

UNITED STATES PATENT OFFICE 2,363,123

LIQUID SHUTOFF VALVE

George E. Franck, Riverside, Ill., assignor to The Imperial Brass Manufacturing Company, Chicago, Ill., a corporation of Illinois Application January 12, 1942, Serial No. 426,520

14 Claims. (Cl. 226—127)

My invention relates to liquid shut-off valves and particularly valves which are used in nozzles for dispensing gasoline and similar liquids.

Among the objects of my invention is to provide a new and improved liquid shut-off valve which is normally operated by hand in order to open and close the filling nozzle and to equip it so that it will shut off automatically whenever certain pressure conditions are built up within the valve casing.

Also among the objects of my invention is to provide a new and improved automatic shut-off valve by means of which an operator may pass liquid into a receptacle such as a gasoline tank and continue passing the liquid into the tank until it is full or until the liquid level reaches a predetermined position; whereupon the shut-off valve will be automatically closed and prevent passing any more liquid into the tank as long as the valve is held therein.

Another object of my invention is to provide an automatic liquid shut-off valve in a nozzle which is cooperable with a flap valve positioned in the tip of the nozzle, it being borne in mind that flap valves or some type of valve which temporarily arrests flow of fluid into a tank may not shut off the flow entirely liquid tight so that some positive tight shut-off of the main valve may be effected in order to prevent the nozzle from dripping after it is removed from a receptacle or tank.

Still further among the objects of my invention is to provide a new and improved automatic shut-off valve device which cooperates with a manual valve control, said device being constructed simply and inexpensively and being further built so that the movable parts are retained in a compact arrangement adjacent or incorporated in the valve so that they may be readily removed and replaced should occasion require.

Figure 3:
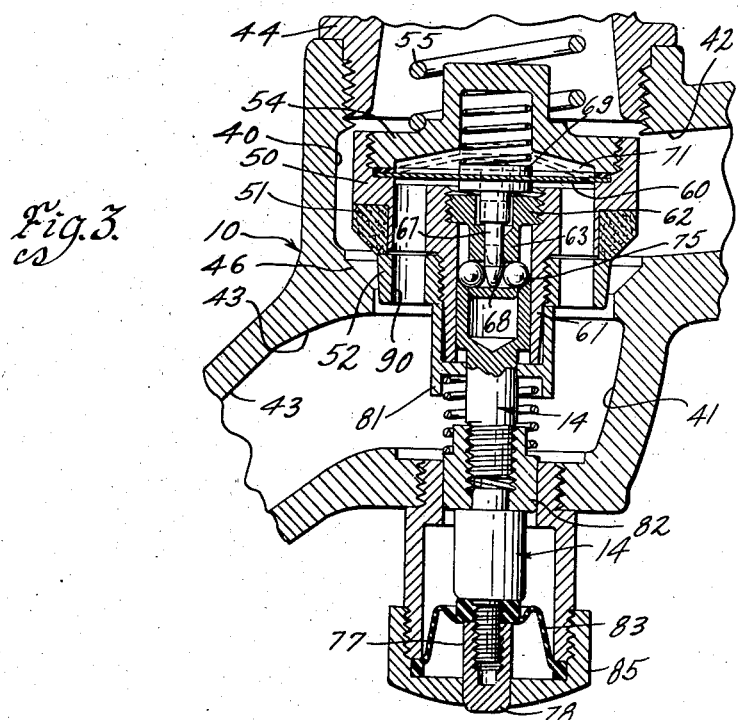
Figure 4:
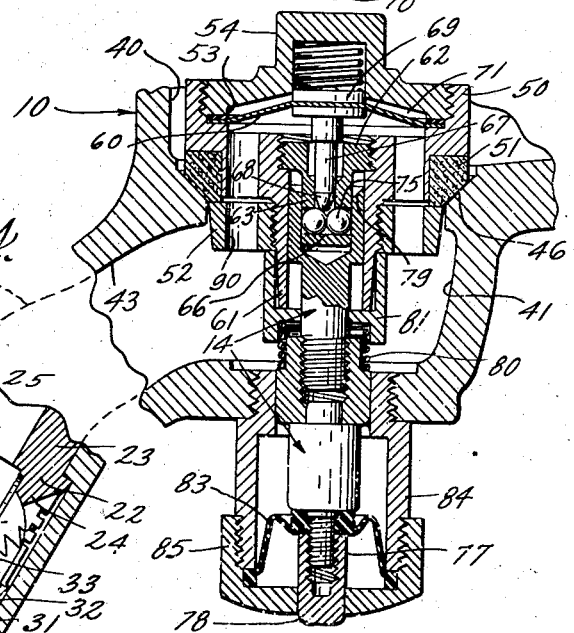

With these and other objects in view, my invention consists in the construction, arrangement and combination of the various parts of my device whereby the objects contemplated are attained, as hereinafter more fully set forth, pointed out in my claims and illustrated in the accompanying drawings, in which:

Figure 1 is a side elevational view of a liquid shut-off valve device showing a nozzle extending therefrom, Figure 2 is an elevational view in section drawn to a slightly larger scale showing valve parts in shut-off position, Figure 3 is a partial elevational view in section showing the parts of the valve in open position, and Figure 4 is a partial sectional view similar to Figure 3 showing the manually operated portion of the valve in open position and the valve proper in closed position.

Many attempts have been made in the past to provide automatic liquid shut-off valves so constructed that they will automatically interrupt the flow of liquid being dispensed into a tank as soon as the level of liquid in the tank has reached a predetermined elevation. Some valves designed for this purpose are operated on the suction principle as, for example, by use of a Venturi tube coupled with certain lever arrangements in order to apply pressure and power to the proper place for shutting off the main valve. Other shut-off valves have incorporated the flap valve idea designed to be tripped under certain pressure conditions, the flap valve thus used being in the nature of an auxiliary type in addition to the shut-off valve. In the case of the latter the valves have not been capable of design so as to tightly seal the nozzle against drip and have therefore been somewhat unsatisfactory. In the former case, too many levers and moving parts have been made necessary and the construction being likewise necessarily somewhat complicated and subject to frequent breakdowns and maladjustments. On other occasions where different principles have been used, the shut-off action has not been sufficiently powerful and ofttimes sluggish so that a prompt and tight closing of the valve could not take place.

The present valve structure is one designed to be incorporated into the casing of an average liquid shut-off valve without unnecessarily changing its shape, construction or size. It is designed as a compact valve mechanism which ordinarily can replace the shut-off valve originally installed in the casing. While being designed primarily for use with an auxiliary flap valve in the nozzle tip, it is contemplated that the mechanism may be made sufficiently sensitive so as to be responsive to only a partial blocking or arresting of the flow of liquid from the nozzle, without a positive shut-off being actually required in every instance.

In the embodiment chosen to illustrate my invention there is provided a valve casing 10 of the usual type seen connected to the hose on gasoline pumps in automobile filling stations. The casing is provided with a connecting end 11 for attachment to a pump hose and a nozzle 12 designed to be inserted in the opening of a gasoline tank. The nozzle is shown connected to the casing by means of a coupling 13. A main shut-off valve stem 14 is shown protruding below the lower side of the casing in contact with a valve handle 15 pivotally supported by the pin 16. A handle guard 17 surrounds the handle and may be so designed as to provide a guide for the free end 18 of the handle. A hook 19 is usually provided for hanging the valve device upon some support adjacent the tank.

Likewise in the embodiment chosen to illustrate the invention there is shown a flap valve at the tip of the nozzle 12. Details of the operation of a flap valve of this type may be found shown as described in Patent No. 2,106,197, dated January 25, 1938. It is to be borne in mind, however, that the particular type of flap valve is not essential as long as some means is provided in the nozzle for temporarily arresting the flow of liquid from the valve whenever liquid level in a receptacle reaches a predetermined elevation.

In order that the operation of the embodiment herein illustrated may be clearly followed, the flap valve herein selected and shown will be described in some particular.

At the tip of the nozzle there is provided a slightly enlarged portion 20 threaded at the end for reception of a cylindrical auxiliary ring 21. Within the end of the nozzle there is provided what may be termed a frame or mounting 22 for the flap valve comprising a cylindrical portion 23 and a projecting segmental portion 24. In the cylindrical portion there is provided an aperture 25 positioned slightly off center with respect to the center line of the nozzle tip.

In the projecting segmental portion there is provided a recess 26 having a curved top and enlarged lower end. A flap valve 27 is shown covering the open side of the recess and pivoted by means of a pin 28 to the lower front edge of the segmental portion. It will be noted that the flap valve is of such length that it overlies the face of the downwardly projecting segmental portion, being positioned slightly inside a lip 29 at the lower side of the cylindrical portion. The length likewise permits the flap valve to seat upon an inner rim 30 of the ring 21. In order to completely shut off the nozzle passage the lower end 31 of the flap valve has a somewhat S shape so that in closed position the lowermost portion will seat against a shoulder 32 positioned slightly above the pivot point 28. A relatively light spring 33 is provided so as to normally hold the flap valve in the position shown in Figure 2 so that the passage within the nozzle is open to the free flow of liquid therethrough.

In this particular type of flap valve when the nozzle is inserted into a gasoline tank, for example, liquid normally flows through the passage 25 and outwardly from the end of the nozzle tip. This flow will continue as long as the main valve is open and until liquid level in the tank closes the opening at the nozzle tip. As soon as the opening is closed liquid passing through the nozzle will not be able to pass freely into the atmosphere and some back surge or back pressure will be created. Then as liquid continues to flow through the nozzle a portion of it may be diverted laterally and upwardly through a passage 34 comprising the bottom or open end of the recess 26. Under such circumstances a slight partial vacuum normally present within the recess 26 due to the passage of liquid past the lower end of the recess will be destroyed. Instead the diversion of liquid may tend to produce a slight pressure within the recess 26 sufficient to offset the pull of spring 33 and tilt the flap valve in a counter-clockwise direction as shown in Figure 2 just far enough so that its tip projects beyond the lip 29. As soon as this has been accomplished the flow of liquid through the nozzle will catch the flap valve and force it under liquid pressure against the rim 30. This action is almost instantaneous and when the nozzle passage is thus blocked, there will be a substantial back pressure built up within the nozzle as far back as the main valve. An effective shut-off is thus produced but inasmuch as the metal portions of the flap valve and the rim 30 cannot be machined with too close a tolerance, it will not be a liquid-tight fit and some drip or leak will continue to occur.

In the casing 10 there is provided a valve chamber comprising an upper portion 40 and a lower portion 41. An inlet passage 42 and an outlet passage 43 communicate with the valve chamber. The outlet passage 43 opens into the nozzle and the inlet passage 42 is designed to communicate with the hose attached to the casing at the end 11. The upper side of the valve chamber, as viewed in Figures 1 and 2, is closed by a cap 44 having hexagonal outer sides 45 to provide a wrench hold. The cap as indicated is threadably engaged in an opening at the top side of the valve chamber.

Within the valve chamber and between the upper and lower portions 40 and 41 there is provide a tapered valve seat 46. Likewise within the chamber is a valve mechanism comprising a body 50, an annular valve 51 normally engaging the valve seat 46 and a locking member 52 designed to hold the valve in place. Within the valve is a recess 53 closed at the upper end, as viewed in Figure 2, by means of a threaded disc 54. A coiled spring 55 is shown engaging the disc at the lower side and the inside of the cap 44 at the upper side normally spring pressing the valve 51 into seated engagement with the seat 46.

Likewise within the recess there is provided a flexible diaphragm 60 sealed at the edges by means of opposed annular faces upon the body 50 and the disc 54.

The body is likewise provided with a sleeve-like portion 61 projecting downwardly through the recess 53, as viewed in Figure 2, for example, and extending beyond the lower surface of the valve body. A plug 62 threadably engages the upper end of the sleeve portion as viewed in Figure 2 and has a reduced lower end 63, the outer wall of which is spaced a short distance from the surrounding wall within the sleeve 61; thereby providing an annular space. The plug in turn has a longitudinal passage 65 and a lateral passage 66 connects the longitudinal passage with the surrounding annular recess.

A projection or pin 67 is secured at its upper end to the diaphragm and has its lower end extending slidably through the longitudinal passage 65 so that the lowermost end 68 of the projection or pin lies within the lateral passage 66. The uppermost end 69 of the projection or pin is firmly secured to the flexible diaphragm and may be normally urged into its initial position by a light coiled spring 70. The position of the diaphragm within the recess 53 forms what may be termed a dead air pocket 71, which, together with the spring 70, acts as a cushion for the diaphragm action.

One or more movable blocking elements having the form of balls 75 are positioned in the lateral passage 66 so that they are initially positioned for potential contact with the end 68 of the projection and by reason of being separated from each other by the width of the projection, the balls extend out into the surrounding annular recess and partially block that recess.

The valve stem 14 extends downwardly through the casing at the lower side and has a lower end 77, the tip 78 of which is designed to engage the adjacent portion of the handle 15. The valve stem has a rim 79 at its uppermost end designed to be slid into contact with the balls 75 as will be later described when the operation of the device is taken up in detail. The portion of the stem adjacent the rim has a sliding fit within the inside wall of the sleeve 61.

In normal shut-off position, as shown in Figure 2, a coiled spring 80 bears at its upper end against a collar 81 and at its lower end against a nut 82. At its lowermost end the stem is provided with a flexible sealing diaphragm 83 clamped around the stem at the inside and sealed at its outside circumference to a projecting portion 84 of the valve casing by means of a sealing nut 85.

*Operation*

When it is desired to pass liquid through the liquid shut-off valve into a receptacle or tank such as a gasoline tank, the tip of the nozzle 12 is inserted into the filling spout of the tank and the handle 15 then raised manually. When the handle 15 is pushed against the valve stem 14 the valve stem is raised, the coiled spring 80 compressed between opposed shoulders and the rim 79 at the uppermost end of the valve stem is pushed into contact with the balls 75. The rim is normally made small enough in thickness so that it will slide into the annular space surrounding the lower end of the plug 62 but because the balls 75 partially block the space they prevent the rim from sliding all the way in. The rim being thus resisted by the balls which are held separated from each other by means of the ends 68 of the projection, upward movement of the valve stem lifts against the sleeve portion 61 and raises the valve body upwardly as viewed in Figure 2 so that the valve 51 is lifted from its seat 46. The valve is thus opened. Liquid under pressure in the inlet 42 then passes over the valve seat and outwardly through the outlet 43 and thence through the nozzle passage into the tank. As long as the valve stem is held upwardly and liquid from the nozzle passes out into the atmosphere from the nozzle tip, the valve remains open.

As soon as the free flow of liquid from the nozzle is temporarily arrested or obstructed as, for example, by the surface of the liquid in the tank raising to a position closing the tip of the nozzle and tripping the flap valve, a slight back pressure will be set up in the outlet. The back pressure necessary to operate the main valve may be light or heavy, depending on how sensitively it is constructed and adjusted. When the flow of liquid is thus temporarily arrested pressure built up will extend its influence through passages 90 so that the effect is felt upon the lower face of the flexible diaphragm 60. The tendency of the back pressure thus built up will be to raise the diaphragm to the dotted position shown in Figure 3, the spring 70 and air pocket supplying a slight cushioning action. As the diaphragm raises the projection or pin 67 likewise shifts with it so that the end 68 is withdrawn from its position between the balls 75. Since at this point there is no resistance to movement of the balls toward each other they will be immediately slid inward within the lateral passage 66 by the tapered end face of the rim 79 to the position shown in Figure 4.

With the balls in this position, they offer no obstruction within the surrounding annular recess and the rim 79 of the valve stem is able to extend into the annular recess. What actually happens is the valve stem and rim remain stationary but the valve body descends with relation to the stem to a position closing the valve as shown in Figure 4. The valve will thus be closed even though the stem remains lifted to opening position by means of the hands of the operator remaining upon the handle 15. No more liquid will flow through the valve while it is in this position. The action of the main valve following the obstruction of the outlet will take place with extreme rapidity so as to appear almost instantaneous. As soon as the main valve has thus shut off automatically there is no flow through the passage in the nozzle as would be necessary to maintain the flap valve 27 in closed position. Thereupon the flap valve will be immediately returned to its initial position as shown in Figure 2 by means of the spring 33 and the contents of the outlet and nozzle passage will immediately drain. No dripping will take place because the nozzle outlet will be wide open permitting all of the liquid to rush out.

In order to reset the main valve, it is necessary only to release the handle and valve stem so that the valve stem may be lowered to the position shown in Figure 2. As soon as the valve stem has been thus lowered the balls 75 will be permitted to separate and will in fact be forced to a position separated from each other by reason of the air cushion in the pocket 71 and light pressure of the spring 70 tending to urge the flexible diaphragm in a downward direction toward its initial position. The main valve and its operating stem will thereby be completely reset for another opening operation. If the nozzle is permitted to remain below the liquid level of the tank and the main valve is again open, there will be immediately a back pressure set up in the outlet and the main valve will be automatically shut off before any appreciable quantity of additional liquid flows into the tank. Should the nozzle be removed and then inserted into an empty tank, the main valve after being open will remain open until the level of the second tank reaches such an elevation as to close the outlet from the nozzle; after which the above-described automatic shut-off will again take place.

As has been indicated the only back pressure needed is sufficient pressure so as to raise the flexible diaphragm 60 enough to withdraw the end of the pin from its position between the balls. In order that the operation of the valve may be sufficiently sensitive it is contemplated that frictional packing may be omitted and a flexible diaphragm packing be substituted therefor as illustrated, for example, by the diaphragm 83. The diaphragm permits complete freedom of movement of the stem but nevertheless effectively seals the clearance between the stem and the casing from leakage of liquid from the valve chamber. It should also be noted that after the valve has automatically closed, whenever the handle is released and the stem 14 left free, the coiled spring 80 acting against the collar 82 will return the stem to its initial position.

There has thus been provided a simple liquid shut-off valve compact in its arrangement and positive in its action so that complete shutting off of the liquid takes place, thereby substantially minimizing the amount of drain or drip from the nozzle after the automatic shut-off has operated.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. A liquid valve device comprising a casing having a valve chamber, an inlet and an outlet forming a path for flow of liquid therethrough and adapted to pass said liquid into a receptacle, said flow being subject to temporary arrestment by contact of the outlet with the surface of liquid in said receptacle, a valve in the chamber actuated by a force exterior of said casing for opening and closing said liquid path, a discontinuous valve stem for operating the valve comprising parts having a separable connection therebetween and having normally a potentially engaged relation to permit opening and closing of the valve, and a shiftable means carried by the valve initially forming part of said separable connection, said valve having a passage therein communicating between a portion of said shiftable means and the liquid path whereby said shiftable means is responsive to back pressure created by said temporary arrestment, said shiftable means having a second position when subjected to said back pressure disengaged from the separable connection whereby said separable connection is released permitting automatic reseating of the valve independently of the stem.

2. A liquid shut-off valve device comprising means defining a path of flow for liquid including a casing having a valve chamber therein, an inlet and an outlet, said flow being subject to temporary arrestment under certain conditions, a valve seat in said chamber and a valve mechanism including a valve body having a valve normally pressed against said seat, said valve body having a recess communicating with the valve chamber and a movable element therein having an initial position and forming a fluid seal in said recess and a passage communicating between one side of the movable element and the path of the liquid within the chamber, said movable element having a second position when subjected to pressure in said passage during said temporary arrestment of the flow, a movable blocking member normally engaging a portion of said movable element, said portion being adapted to move with the movable element and having a position removed from said first position and out of engagement with the blocking member when the movable element is subjected to said pressure and a valve stem having a portion thereof jointly engaging said blocking member and said body during a valve opening movement, said portion having a position released from engagement with the blocking member on removal of said movable element to permit automatic closing of said valve.

3. A liquid shut-off valve device comprising means defining a path for flow of liquid including a casing having a valve chamber therein, an inlet and an outlet, said flow being subject to temporary arrestment under conditions wherein said outlet is restricted, a valve seat in the chamber and a valve mechanism including a body and a valve thereon normally pressed against the seat, a movable element on the body having an initial position under normal and free flowing condition of liquid, a passage communicating between the movable element and the outlet, said element having a second position when subjected to pressure due to said temporary arrestment of flow, a movable blocking means and a manually operable valve stem element for opening and closing the valve, one of said elements during the manual opening operation being jointly in engagement with the blocking means and the body and the other of said elements being in engagement with said blocking means, said movable element in the second position thereof being disengaged from contact with the blocking means permitting automatic reseating of the valve.

4. A liquid shut-off valve device comprising means defining a path for flow of liquid including a casing having a valve chamber therein, an inlet and an outlet, said flow being subject to temporary obstruction under predetermined conditions, a valve seat in said chamber and a valve mechanism including a valve body and a valve thereon normally engaging said seat, a flexible member having a free midportion in an initial position and edges thereof secured to the valve body and a passage communicating between one side of the flexible member and the valve chamber, the midportion of said flexible member having a second position when subjected to pressure in said passage during obstruction of the flow, a projection on the flexible member and a movable blocking member normally engaging the projection, said projection having a second position in company with the flexible member out of engagement with the blocking member when the flexible member is subjected to said pressure and a valve stem having a portion thereof jointly engaging said blocking member and said body during a valve opening movement and having a position released therefrom when said projection is out of engagement with the blocking member to permit automatic closing of the valve.

5. A liquid shut-off valve device comprising means defining a path of flow for the liquid including a casing having a valve chamber therein, an inlet and an outlet, means in the outlet providing a temporary obstruction during certain periods of flow, a valve seat in said chamber and a valve mechanism including a valve body and a valve thereon normally spring pressed against said seat, a diaphragm mounted in the valve body in an initial position and a passage communicating between one side of the diaphragm and the outlet, said diaphragm having a second position when subjected to back pressure in said passage during obstruction of the outlet, a projection on the diaphragm and a movable blocking member initially engaging the projection, said projection having a second position shifted in company with the diaphragm away from said initial position and out of engagement with the blocking member when the diaphragm is subjected to said pressure and a manually operated valve stem having a portion thereof jointly engaging said blocking member and said body during a valve opening movement, said portion having a position released from said engagement on removal of said projection to permit automatic closing of said valve.

6. A liquid shut-off valve device comprising means forming a path for flow of liquid including a casing having a valve chamber therein, an inlet and an outlet adapted to be inserted into a receptacle into which liquid is being introduced, said flow being subject to temporary restriction by the raising of the liquid level in said receptacle, a valve seat in said chamber, a valve mechanism including a body and a valve thereon normally spring pressed against said seat, said body having a recess therein open toward the outlet side, a flexible element in said recess sealed at the edges thereof, a centrally disposed portion on said body member having an axial passage, a pin slidably mounted in the axial passage connected to the flexible element, said body having an annular space surrounding said pin, a valve stem extending through the casing, a movable element jointly engaging said stem, said pin and said body when the stem is moved to valve opening position, said flexible element having a lifted position when subjected to increased liquid pressure when the flow is restricted wherein the pin is removed from contact with the movable element and said valve returns to shut-off position while the stem remains in valve opening position.

7. A liquid shut-off valve device comprising a casing having a valve chamber therein, an inlet and an outlet, means in the outlet providing a temporary obstruction during certain periods of flow, a valve seat in said chamber and a valve mechanism including a body and a valve thereon normally spring pressed against said seat, said body having a recess therein opened toward the outlet side, a diaphragm in said recess forming a closed pocket in the bottom thereof, a centrally disposed portion in said body having an axial passage, an annular recess surrounding said passage and a lateral passage connecting said recess and said axial passage, a pin slidably mounted in the axial passage connected to the diaphragm and a freely movable element positioned in the lateral passage in contact with the pin at one side and obstructing said annular recess at the other side, a valve stem engaging a handle outside the casing and extending therethrough and having a portion thereof extendable into contact with said movable element for opening the valve, said diaphragm having a lifted position when subjected to increased liquid pressure wherein the pin is removed from contact with the movable element and said valve returns to shut-off position while the stem remains in valve opening position.

8. A liquid shut-off valve device for passing liquid into a tank comprising a casing having a valve chamber therein, an inlet, an outlet and a nozzle extending from said outlet, an automatic flap valve at the end of said nozzle responsive to liquid flowing through the nozzle and adapted to arrest the flow of liquid therethrough when liquid level in the tank reaches the location of said flap valve, a main valve seat in the chamber, a shut-off valve mechanism including a body and a spring-pressed valve element on the body normally engaging said seat, said body having a recess therein normally open to the outlet side of the chamber, a diaphragm at the bottom of the recess forming a closed air pocket having an initial position during unrestricted flow of liquid through the valve and a projection extending from the diaphragm toward the open end of the recess, said body having a sleeve portion within said recess and a plug in the sleeve portion having a part thereof spaced from the inside wall of the sleeve forming an annular space, said plug having an axial passage slidably receiving the projection and a laterally extending passage communicating between the axial passage and the annular space, balls in said lateral passage on opposite sides of the projection normally engaging said projection and at least partially obstructing the annular space around said plug, a valve stem extending slidably through the casing wall and a flexible frictionless sealing element closing the space between the stem and the casing, an exterior handle for the stem, said stem having a rim at the inside end initially engaging said balls and adapted to be pushed thereagainst to lift the main valve to open position, said diaphragm having an upwardly extended position when subjected to liquid back pressure upon the closing of said flap valve wherein the projection is withdrawn from between said balls permitting movement of the balls out of said annular space and movement of the main valve to shut-off position while said stem remains fixed in position.

9. A liquid shut-off valve device for passing liquid into a tank comprising a casing having a valve chamber therein, an inlet, an outlet and a nozzle extending from said outlet, an automatic flap valve at the end of said nozzle adapted to be tripped to closed position by action of liquid flowing through the nozzle and adapted to arrest the flow of liquid therethrough when liquid level in the tank reaches the location of said flap valve, a main valve seat in the chamber, a shut-off valve mechanism including a body and a spring-pressed valve element on the body normally engaging said seat, said body having a recess therein normally open to the outlet side of the chamber, a flexible element at the bottom of the recess sealed at the edges thereof forming an air pocket having an initial position during unrestricted flow of liquid through the valve and a projection extending from the diaphragm toward the open end of the recess, said body having a sleeve portion within said recess and within the sleeve a plug-like element spaced from the inside wall of the sleeve forming an annular space, said plug element having a longitudinal passage slidably receiving the projection and a cross passage extending therefrom communicating with the longitudinal passage, movable blocking means in said last passage laterally disposed relative to the projection and when in engagement therewith having a position obstructing the annular space around said plug element, a valve stem extending slidably through the casing wall and an exterior handle therefor, said stem having a rim at the inside end initially engaging said blocking means and adapted to be pushed thereagainst to lift the main valve to open position, said flexible element having an upwardly extended position when subject to liquid pressure upon the closing of said flap valve wherein the projection is withdrawn from a position of contact with said blocking means permitting movement of said last means out of said annular space and movement of the main valve to shut-off position while said stem remains fixed in position.

10. A liquid shut-off valve device comprising a casing having a valve chamber, a valve seat, an inlet and an outlet forming a path for flow of liquid therethrough and adapted to pass liquid into a receptacle, said flow being subject to temporary arrestment by contact of the outlet with the surface of liquid in the receptacle, and a manually actuated valve mechanism in the chamber for opening the valve and for automatically closing the liquid path comprising a valve body, a valve element on the body cooperable with the seat, a movable element carried on the valve body having positions subject to changes in pressure in the outlet, a valve stem attached to the body extending through the casing, and an automatic shut-off mechanism for the valve carried by the valve body and having cooperable contact with the stem, said shut-off mechanism having an initial engagement with the movable element and having a position released from engagement with said element upon repositioning of the movable element to permit closing of the valve, independently of the position of the valve stem.

11. A liquid shut-off valve device comprising a casing having a valve chamber, a valve seat, an inlet and an outlet forming a path for flow of liquid therethrough and adapted to pass liquid into a receptacle, said flow being subject to temporary arrestment by contact of the outlet with the surface of liquid in the receptacle, and a manually actuated valve mechanism in the chamber for opening the valve and for automatically closing the liquid path comprising a valve body, a valve element thereon, a movable element on the body subject to pressure changes in the outlet a valve stem attached to the body extending through the casing, and an automatic shut-off mechanism engaging the movable element at one position thereof and disengaged therefrom at another position thereof to permit automatic closing of the valve, said body, said valve element, said movable element, and the automatic shut-off mechanism being disposed about a common axis.

12. A liquid shut-off valve device comprising means defining a path of flow for liquid including a casing having a valve chamber therein, an inlet and an outlet, a valve seat in said chamber and a valve mechanism including a valve element normally pressed against the seat and a valve stem including parts having initial engagement with each other and adapted to be separated one from the other, one of said parts being attached to the valve element and the other of said parts having a position extending through the casing, said valve and valve stem having movement through a predetermined distance between seating position and full open position, said casing having a pocket surrounding said other part of the valve stem, a nut engaging the casing surrounding the pocket and the stem and a flexible diaphragm folded within the pocket having an extension movement greater than the movement of the valve stem, said diaphragm having a reinforced rim sealed between the body and the edge of the nut and a reinforced center sealed around the valve stem.

13. A liquid valve device comprising a casing having a valve chamber, an inlet and an outlet forming a path for flow of liquid therethrough and adapted to pass said liquid into a receptacle, said flow being subject to temporary arrestment by contact of the outlet with the surface of liquid in said receptacle, a valve mechanism in the chamber actuated by a force exterior of said casing for opening and closing the liquid path comprising parts consisting of a valve and a discontinuous valve stem for operating the valve including elements having a separable connection therebetween and having normally a potentially engaged relation to permit opening and closing of the valve, said valve mechanism including a shiftable means on one valve part initially forming part of said separable connection and movable in response to a change in pressure of liquid flowing through the valve device, said separable connection comprising a sleeve on one separable portion thereof, a hollow plug extending into the sleeve and spaced from the walls thereof and a projection on the movable element having a tapered end slidably extending within the hollow plug, said plug having a lateral passage crossing the plug in line with one position of the tapered end and a set of rounded elements in the passage respectively in contact with the tapered end and the wall of the sleeve, a collar on the other portion of the separable connection having a wedge shaped end normally spring pressed into the space between the wall of the sleeve and the plug adapted to engage said rounded element, said rounded elements having positions removed from contact with the collar upon retraction of the movable element and pin thereby breaking the engaged relationship of the parts of said separable connection.

14. A liquid valve device comprising a casing having a valve chamber, an inlet and an outlet forming a path for flow of liquid therethrough and adapted to pass said liquid into a receptacle, said flow being subject to temporary arrestment by contact of the outlet with the surface of liquid in said receptacle, a valve mechanism in the chamber actuated by a force exterior of said casing for opening and closing the liquid path comprising parts consisting of a valve and a discontinuous valve stem for operating the valve including elements having a separable connection therebetween and having normally a potentially engaged relation to permit opening and closing of the valve, said valve mechanism including a shiftable means on one valve part initially forming part of said separable connection, and having a passage therein communicating between a portion of said shiftable means and the liquid path whereby said shiftable means is responsive to back pressure created by said temporary arrestment, said shiftable means having a second position when subjected to back pressure disengaged from the separable connection whereby said separable connection is released permitting automatic reseating of the valve independently of the stem.

GEORGE E. FRANCK.